July 1, 1930. F. F. ANDERSEN 1,768,876
PNEUMATIC VEHICLE WHEEL
Filed May 11, 1929   2 Sheets-Sheet 1

Inventor:
Felix Fridtjov Andersen
By
Pennie Davis Marvin & Edmonds
attorneys

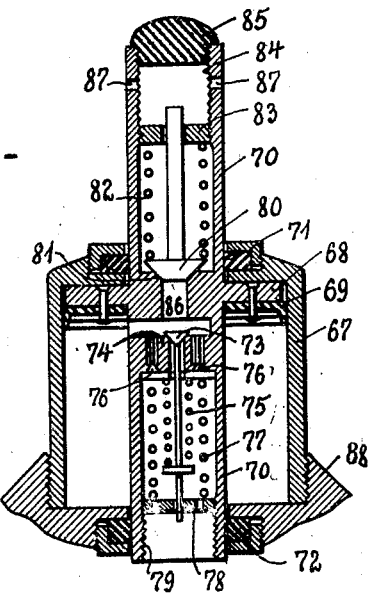
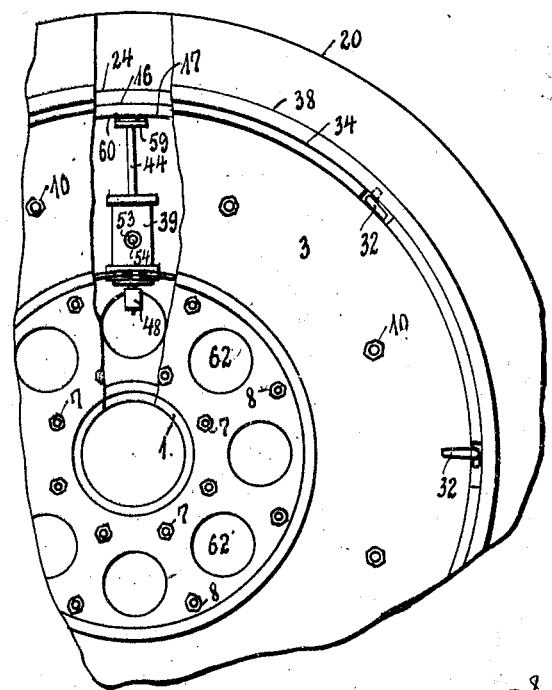

Patented July 1, 1930

1,768,876

UNITED STATES PATENT OFFICE

FELIX FRIDTJOV ANDERSEN, OF OSLO, NORWAY

PNEUMATIC VEHICLE WHEEL

Application filed May 11, 1929, Serial No. 362,374, and in Norway May 11, 1928.

The present invention relates to vehicle wheels and has as one of its objects the provision of new and improved means for pneumatically cushioning a wheel against such shocks as may be imparted to it during operation.

More particularly, the present invention concerns the provision of pneumatic cushioning means which may be constructed as an integral part of a wheel assembly or as a separate unit adapted to be applied to a wheel, and which possesses a wearing surface or tread of flexible material, such as vulcanized rubber and cord or fabric, similar to a standard pneumatic tire.

By means of the present invention, a wheel may be pneumatically cushioned against shocks without incurring the inconvenience of punctures and blow-outs customary with present forms of pneumatic tires. Moreover, the wheel may always be supported by a pneumatic cushion of substantially the same pressure, for a further feature of the present invention is the provision of means whereby a constant pressure may be maintained. When for any reason the pressure of the pneumatic cushion is increased or decreased, such means will automatically function to withdraw or supply air until the desired pressure is again established.

Further objects and novel features of the herein disclosed construction will be apparent from the following description and drawings which illustrate, by way of example, several embodiments of the invention.

In the drawings,

Fig. 3 shows as a detail a section through a modification of the pump structure, shown in Figs. 1 and 2.

Fig. 4 shows a fragmentary side view of a wheel according to the invention.

Figure 1:
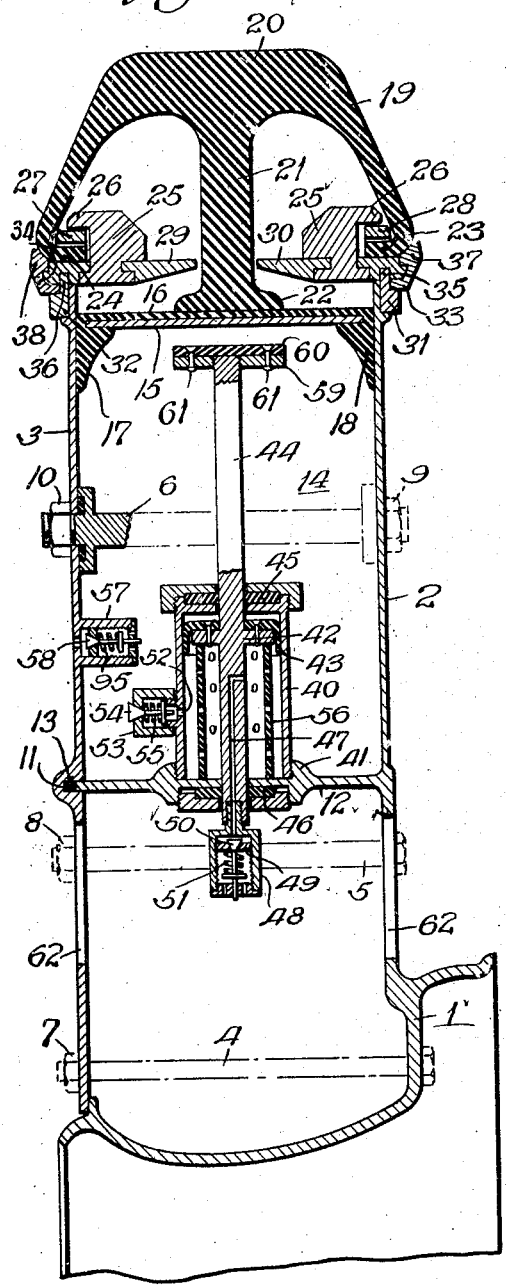
Fig. 1 is a radial, sectional view of one embodiment of the invention.

In Fig. 1, 1 is the hub of a wheel and 2 and 3 are disk shaped members fastened to the hub. Of these disk shaped members, 2 is welded or otherwise permanently fixed to the hub 1, and 3 is attached to the hub 1 and to the disk 2 by means of suitable bolts 4, 5 and 6 and nuts 7, 8, 9 and 10. At a suitable distance from the axis of the wheel, a ringformed plate 12 is permanently fastened to the disk 2 and extends into an annular slot 13 located in the disk 3. Suitable packing 11 is arranged in the slot 13 to provide an airtight joint between the plate 12 and the disk 3 when the parts are put together. In this manner an annular U-shaped chamber 14 is provided around the hub at a suitable distance from the same. At its outer periphery, this chamber is closed by means of a ringformed plate or the like 15 covered by a flexible layer 16, which has inwardly extending ring flanges 17 and 18 in slidable contact with the inside surface of the plates 2 and 3.

In order to prevent the sticking of the flanges 17 and 18 to the inside of the plates 2 and 3, due to heat or other causes, these plates may be coated with a layer of glycerine or other suitable lubricating means, which has no harmful influence on the material of which the flanges 17 and 18 are composed. It has been found suitable to make the cover layer 16 and the flanges 17 and 18 of a material similar to that used in the tire 19, which may be composed of rubber with a cord or fabric carcass, as is customary in tire manufacture. The tire 19 consists of the wearing surface proper 20, which has an inwardly projecting ringformed flange 21 provided with a foot-like formation 22 resting against the cover layer 16 and the plate 15. The sides of the tire 19 have bent in flange sections 23 and 24 which are held in position by means of a number of turnably mounted catch members 25, which—when turned in holding position— have noses 26 bearing upon metal ring members 27, 28 engaging the flanges and pressing them against metal rings 29, 30. These rings, which support the catch members 25, are secured to the side disks 2 and 3 by means of hooks 31, 32, which are so mounted on plates 2 and 3 as to extend through slots in outwardly bent flanges 33 and 34 of the disks and into suitable apertures 35 and 36 in the ring members 29 and 30. The outwardly bent flanges 33, 34 on the disks 2 and 3 are further provided with bent portions 37 and 38 so shaped as to lock with suitable projections on the ring members 29 and 30, and retain the tire in position.

Very simple and effective means are thus provided for attaching the tire 19 to the side disks 2 and 3 of the wheel, the whole process of doing so being performed in the following sequence:

First the metal rings 28, 27 are arranged inside the in-bent flange portions 23, 24 of the tire 19. Thereafter the ring plates 29, 30 are placed in position, one on each side of the foot member 22, and the catch members 25 are turned into the position shown in the drawing. The tire, together with the rings 27, 28 and 29, 30, is then mounted in position on the plate 2, the plate 3 having previously been detached from the hub and the plate 2. The hooks 31 are then turned into locking position as shown in the drawing, whereby the tire assembly is rigidly attached to the plate 2. The other plate 3 is then fixed in position and the nuts 7, 8, 9 and 10 drawn tight. The hooks 32 are then turned into locking position, whereafter the wheel assembly is complete.

Initially, the space 14 defined by the ring plates 12 and 15 and the disk plates 2 and 3 may be furnished with compressed air at suitable pressure in any well-known manner. In order to maintain this pressure constant during operation, a pump member 39 is provided which is adapted to function under the influence of the rotation of the wheel. This pump consists of a cylinder 40, attached to a threaded boss 41 on the inside of the plate 12. A piston 42 provided with a packing 43 is arranged to reciprocate in the cylinder 40. This piston is provided with a piston rod 44 extending through both ends of the cylinder, suitable stuffing boxes 45 and 46 being provided at each end where the rod passes through. To permit the inlet of air into the cylinder, a channel 47 is provided extending axially of the piston rod 44 from one end thereof and terminating in a bent portion communicating with the interior of the cylinder. On the end of the piston rod from which the channel extends is mounted a non-return valve 48 communicating with the channel 47. This valve 48 comprises a valve seat 49 and a valve member 50 biased against the seat by means of a suitable spring 51. If desired, the valve seat 49 may be adjustably arranged in the valve 48 in order to permit adjustment of the tension on the spring 51. The pump cylinder 40 is provided with an aperture 52 leading to a valve 53 enclosing a member 54 biased against the valve seat by means of a suitable spring 55. If desired, a rubber bushing or other suitable flexible member 56 may be arranged in the cylinder 40 to bias the piston 42 toward one end thereof. The chamber 14 is also provided with a non-return valve 57 having a valve member 58 biased against the valve seat by means of a spring 95, the tension of which may be suitably adjusted to permit the valve to act as a safety valve governing the pressure in the chamber 14. On the end of the piston rod 44 nearest the tire 19 is secured a plate 59, which on its side adjacent the plate 15 is covered with a rubber layer 60 fastened to the plate 59 by means of copper rivets or the like 61.

The pump and valve mechanism constructed as above described will function in the following manner:

When the air pressure in the chamber 14 decreases below a certain given pressure, the tire flattens out to some extent and causes the foot 22 to press against the ring plate 15 and force it toward the wheel axis. The ring plate 15 thus will bear against the plates 59, 60 and force the piston rod 44 and the piston 42 inwardly toward the center of the wheel. The air in contact with the piston 42 will be compressed and forced through the valve 53 into the chamber 14. After the pump stroke has been finished, the piston will move back to its initial position, because of the vacuum on the other side of the piston and also because of centrifugal force and the action of the rubber buffer 56. This function will be repeated once for every rotation of the wheel, so long as the pressure within the chamber 14 has not reached the desired value. If the adjustment of the several parts should be such that the foot 22 forces the plate 15 against the plates 59, 60 after this pressure has been attained, the valve 57 will function and let some air out of the chamber 14 and prevent the pressure from increasing above the desired value.

It is needless to add that the disk plates 2 and 3 need not be solid but may be provided with a number of circular or otherwise shaped apertures 62 in the portion of them which lies between the ring plate 12 and the hub 1. These apertures will serve to lighten the weight of the plates and also permit the valve 48 to be reached and adjusted.

Figure 2:
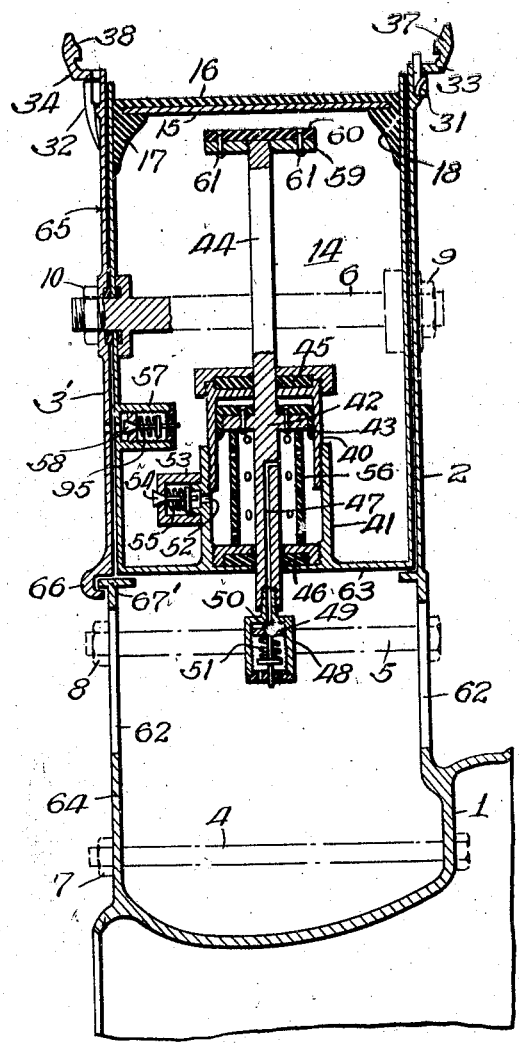
Fig. 2 is a detail of a similar view of a modified embodiment of the invention.

In Fig. 2 a second embodiment of the invention is shown. In this embodiment the disk plates 2 and 3′ do not in themselves provide the air-tight chamber 14, the latter being formed by means of metal container 63, which may be manufactured in one piece and applied as a separate unit to the wheel. The pump arrangement is similar to that shown in Fig. 1 except that it is mounted on the container instead of on the ring plate 12. The fastening means for the tire, which is not shown in Fig. 2, is the same as in Fig. 1. The chief difference between the wheel construction of the two embodiments is the formation of the disk plate 3′ in two parts instead of one, the inner one 64 being directly attached to the hub 1 by welding, or formed integral therewith, while the outer part 65 is attached to the disk 2 by means of a plurality of bolts 6 passed through the air-tight container 14 and fastened with nuts 9 and 10 to the opposite side. The connection between the inner and outer part of the disk 3' may be effected by means of ring formed slots 66 in the outer part, serving to receive the ring formed flange 67' on the inner part.

In Fig. 3 is shown a modified form of the pump for maintaining a suitable pressure within the chamber 14. In this embodiment, the three valves previously described, the inlet valve, the pressure valve and the safety valve, are all arranged within the piston rod of the pump, thereby providing a pump which can easily be taken out for inspection or adjustment of the valves and making it unnecessary to provide the chamber 14 with valve arrangements.

The pump in Fig. 3 consists of a cylinder 67, which may be attached to the ring plate 12, the container 63 or—as indicated in broken-away section in Fig. 3—to the hub 88 of the wheel. The piston 68 is arranged for reciprocating movement within the cylinder 67 and is provided with a suitable packing 69. The piston rod 70 extends through both ends of the cylinder 67 through suitable stuffing boxes 71, 72. On the end nearest the wheel axis, the piston rod is hollow and is provided with a non-return valve 73 held against the valve seat 74 by means of a spring 75. Additional valves 76 are also provided which are pressed against their respective valve seats by a spring 77 adjustably held in position by a perforated disk 78 attached to the piston rod 70 by means of suitable threads 79. In the other end of the piston rod, which also is hollow, a non-return valve 80 is arranged, which is held against the valve seat 81 by a suitable spring 82, the pressure of which may be adjusted by a perforated disk 83, fastened to the piston rod 70 by means of threads 84. At the end, the piston rod 70 may be provided with a head or cap 85 of hard rubber or other suitable material.

When the pump functions, the ring plate 15 will come down on the head 85 and push the piston rod 70 and the piston 68 towards the other end of the cylinder 67, thereby increasing the pressure on the other side of the piston and providing a vacuum on the first side. When the pressure on the compression side of the piston reaches a certain value, the valve 80 will be lifted from the seat 81 and the air from the compression side of the piston will flow through the channel 86 and through the apertured disk 83 and the perforations 87 in the piston rod 70 into the chamber 14.

When the working stroke has been completed, the vacuum outward of the piston 68 will force the piston back into its initial position, and the atmospheric pressure on the valve 73 will force the same from its seat 74, with the result that the air from the outside will flow through the channel 86 into the cylinder 67 inward of the piston 68. However, should the force necessary to lift the valve 80 when the piston is effecting the working stroke be greater than the predetermined pressure, this pressure will overcome the action of the spring 77 against the plurality of valves 76, and the compressed air on the compression side of the piston 68 will be permitted to flow through the valves 76 and out through the perforated disk 78 to the atmosphere. In this way, the valve 73 takes the place of the valve 48 shown in Figs. 1 and 2. The valve 80 represents the valve 53 in Figs. 1 and 2, and the plurality of valves 76 corresponds to the safety valve 57 in Figs. 1 and 2.

It should be understood that the foregoing description merely represents the preferred embodiments of the invention, and that any number of changes with respect to the different parts described may be undertaken without departing from the scope of the invention, which is only limited by the appended claims.

I claim:—

1. In a pneumatic wheel, spaced disk-like members forming an annular pressure chamber, the inner periphery of which is defined by a ring plate rigidly held in position between said disk-like members and the outer periphery of which is defined by a flexible band ring slidably mounted in contact with the sides of said chamber to move in a substantially radial direction, and flexible packing disposed between the side edges of said band ring and the inside surfaces of said chamber, said packing having projecting flanges extending into said chamber toward the axis of the wheel adapted to be held in air-tight contact with the inner surfaces of said chamber by the pressure therein.

2. In a pneumatic wheel, spaced disk-like members forming an annular pressure chamber, the inner periphery of which is defined by a ring plate rigidly held in position between said disk-like members and the outer periphery of which is defined by a flexible band ring slidably mounted in contact with the sides of said chamber to move in a substantially radial direction, means for providing air-tight joints between the side edges of said band ring and the inside surfaces of said chamber, and means for maintaining constant pressure in said chamber, said last named means comprising a pump having a cylinder, a piston in said cylinder, a piston rod attached to said piston and extending radially outward in proximity to said band ring, whereby said band ring may engage said piston rod and force said piston into said cylinder on the working stroke when said band ring is moved inwardly in said chamber, valve means for admitting air at atmospheric pressure into said cylinder, and valve means for admitting compressed air from said cylinder into said annular chamber.

3. Pneumatic cushioning means for wheels provided with a tire, comprising an annular metallic member of U-shaped cross section having its open side defining its outer periphery, and a flexible metallic band ring closing the open side of said member and forming therewith an air-tight pressure chamber, said ring being adapted to be resiliently held in place by the pressure in said chamber and to be freely movable therein upon the exertion of pressure by the wheel tire.

4. Pneumatic cushioning means according to claim 3, including flexible rubber flanges mounted on the side edges of the band ring and extending into the chamber, said flanges being adapted to provide free sliding contact with the side walls of the chamber.

5. In a pneumatic wheel, an annular metallic member of U-shaped cross section having its open side defining its outer periphery, a flexible metallic band ring closing the open side of said member and forming therewith an air-tight pressure chamber, and a tire surrounding said member and contacting with said band ring, said band ring being adapted to be resiliently held in contact with said tire by the pressure in said chamber and to be freely movable therein upon the exertion of pressure by said tire.

6. A pneumatic wheel according to claim 5, including means forming an annular pocket for receiving a portion of the annular member.

7. A pneumatic wheel according to claim 5, including a hollow tire having a central ring shaped flanged portion extending toward the wheel axis into engagement with the outer surface of the band ring.

8. A pneumatic wheel according to claim 2, including a relief valve associated with the pressure chamber, said valve being adapted to open and permit the escape of air from the chamber when the pressure therein exceeds a predetermined value.

In testimony whereof I have signed my name unto this specification.

FELIX FRIDTJOV ANDERSEN.